(No Model.) 2 Sheets—Sheet 2.
M. J. NIGHTINGALE & J. B. STEARNS.
SEED SOWER.
No. 502,051. Patented July 25, 1893.
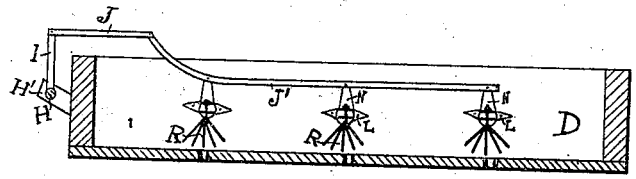
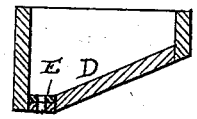
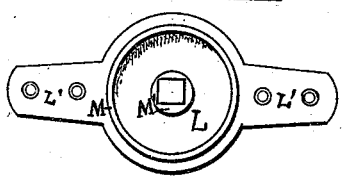
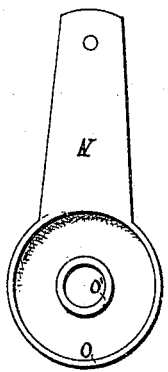
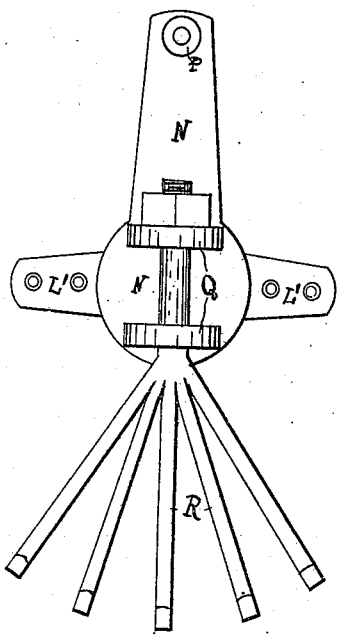
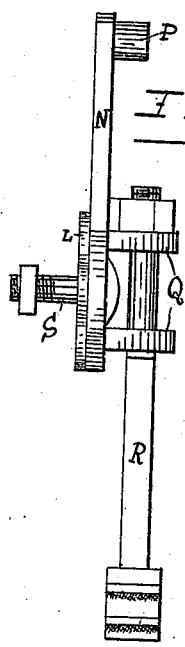
Witnesses
Molbry Haynes
James T. Summerville
Inventors
Miles J. Nightingale
James B. Stearns
per Joshua B. Webster Attorney

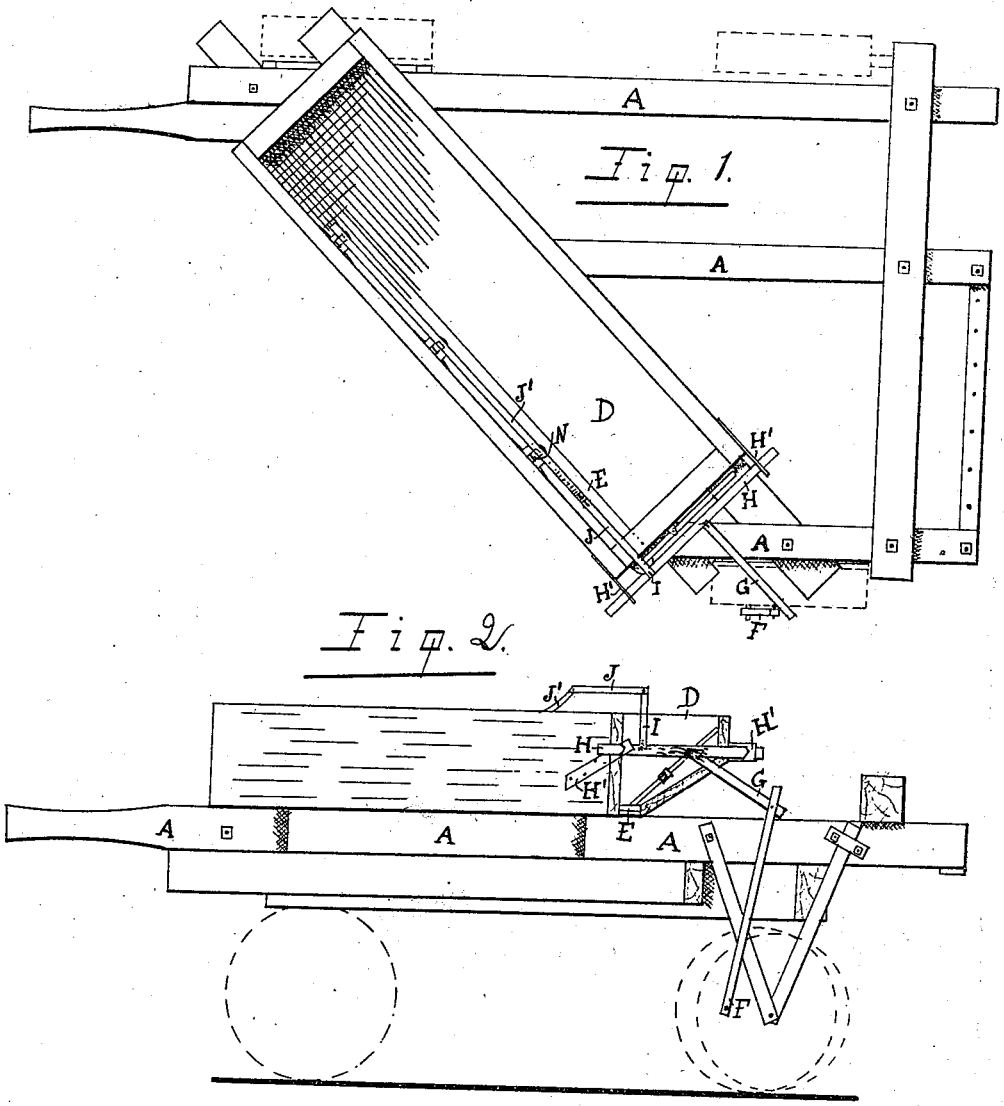

UNITED STATES PATENT OFFICE.

MILES J. NIGHTINGALE AND JAMES B. STEARNS, OF OAKDALE, CALIFORNIA.

SEED-SOWER.

SPECIFICATION forming part of Letters Patent No. 502,051, dated July 25, 1893.

Application filed January 10, 1893. Serial No. 457,944. (No model.)

*To all whom it may concern:*

Be it known that we, MILES J. NIGHTINGALE and JAMES B. STEARNS, citizens of the United States, residing at Oakdale, in the county of Stanislaus and State of California, have invented certain new and useful Improvements in Seed-Sowers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to seed sowers used mainly for sowing grain broadcast and it consists of an improved form of agitator and in the method of operating the same; also in such other combination and arrangement of devices as will be more fully hereinafter set forth and particularly pointed out in the claims.

Figure 1 is a plan view of a plow having our improved seed sower attached thereto. Fig. 2 is a right hand side elevation of the same. Fig. 3 is a detached sectional side view of the seed box showing the agitators. Fig. 4 is a cross-section of the same. Fig. 5 is a detached front view of one of the agitators, showing its different parts. Fig. 6 is a side view of same. Figs. 7 and 8 are detached views of the supports of the agitators.

A represents the longitudinal timbers of a gang plow frame, adapted to carry our improved seed sower box or hopper.

D. is the seed sower box or hopper, into which the seed is deposited, which box has a sloping bottom and at one side is provided with a movable regulator or slide bar E, provided with suitable discharge holes or outlets.

F, is a driving pitman, which is flexibly attached to one of the front bearing wheels of the gang plow. The pitman F, at its upper end, is flexibly attached to an arm G, which is rigidly attached to a rock shaft H, which has its bearings in hangers H', attached to the sides of the hopper D, and is located at the outer end of the hopper, D, and is provided with a vertical arm I, to which, at its apex, is flexibly attached a horizontal rod J, to which is flexibly attached an arm J'.

To the side of the hopper D, plates L, at suitable intervals, are attached as will be shown, which plates L are provided, on their faces with circular raised ways M, and hollow journals M'.

Fitting into the plates L, are plates N, having similar faces provided with circular raised ways O and journal center bearings O'. The tops of the plates N, are provided with journals P, which engage with the arm J', secured flexibly thereto by bolts or pins.

The plates N, are provided, at their backs, with face lugs Q, which are provided with center passages or openings, into which are inserted, preferably, five pronged agitators, R. S are bolts, by which the plates N and L are attached to the back side of the hopper, D. The prongs of the agitators R are located directly above their respective discharge holes in the sliding bar, E, there being corresponding holes in the bottom of the hopper, D.

The seed is poured into the hopper D. The sliding bar E, is arranged in such position relative to the holes in the bottom of the hopper, as will control the flow of the seed therefrom. The plow is then put in motion and, as a consequence, the driving mechanism between the arm J' and the plow wheel, sets the agitators in motion, and stirring up the seed, forces it uniformly into the outlet holes, from whence it drops upon the ground.

Having thus described our invention, what we claim is—

1. The combination with the gang plow frame of the sloping bottomed hopper D, provided with the perforated slide bar E, the pitman F, the arm G, the rock shaft H, the hangers H', the vertical arm I, the horizontal rod J, the arm J', the pronged agitators R attached to plates N by means of face lugs Q the plates N, provided with journals P, which are attached to the arm J' by bolts, such plates provided with raised ways O, and journal bearings O', the plates L, provided with circular raised ways M, and hollow journals M' engaging with the journal bearings O' of the plates N, and the lugs L' of the plates L, attached to the side of the hopper D, and the bolts S, flexibly securing the plates N and L to the back side of the hopper, all arranged and operating substantially as set forth and described, 2. In a seed sower, the combination with a hopper having a discharge aperture; of a plate N, pivotally mounted in the hopper and having lug journals on its exposed face, a shaft journaled in the lug journals of the plate N, and carrying a series of prongs, a reciprocatory bar connected to the plate N, and a suitable means for actuating said bar, substantially as and for the purpose set forth.

3. In a seed sower, the combination with a hopper having a discharge aperture; of a plate L, connected to one wall of the hopper and having a circular flange M, a pivoted plate N, having a flange O, adapted to engage the flange M, and also having lug journals on its exposed face, a shaft journaled in the lug journals of the plate N, and carrying a series of prongs, and a suitable means for rocking or oscillating the plate N, substantially as and for the purpose set forth.

In testimony whereof we affix our signatures in presence of two witnesses.

MILES J. NIGHTINGALE.
    JAMES B. STEARNS.

Witnesses:
 JOSHUA B. WEBSTER,
 E. S. BARKIS.